(12) United States Patent
Jones et al.

(10) Patent No.: US 9,376,912 B2
(45) Date of Patent: Jun. 28, 2016

(54) APPARATUS AND METHOD FOR ANCHOR BOLT GROUTING

(71) Applicant: DSI UNDERGROUND SYSTEMS, INC., Martinsburg, WV (US)

(72) Inventors: Roy Carlton Jones, Hagerstown, MD (US); Phillip Edwin Gramlich, Jr., Morgantown, WV (US)

(73) Assignee: FCI Holdings Delaware, Inc., Pittsburgh, PA (US)

( * ) Notice: Subject to any disclaimer, the term of this patent is extended or adjusted under 35 U.S.C. 154(b) by 360 days.

(21) Appl. No.: 13/972,441

(22) Filed: Aug. 21, 2013

(65) Prior Publication Data

US 2013/0336726 A1 Dec. 19, 2013

Related U.S. Application Data

(62) Division of application No. 13/095,727, filed on Apr. 27, 2011, now Pat. No. 8,539,992.

(51) Int. Cl.
*E21F 17/00* (2006.01)
*B65B 29/10* (2006.01)
*E21D 20/02* (2006.01)
(Continued)

(52) U.S. Cl.
CPC .............. *E21F 17/00* (2013.01); *B65B 29/10* (2013.01); *B65B 39/00* (2013.01); *E21D 20/026* (2013.01); *E21D 20/028* (2013.01); *F16B 13/142* (2013.01); *F16B 13/146* (2013.01); *B65B 2220/14* (2013.01)

(58) Field of Classification Search
CPC ........... E02D 5/76; E21D 20/00; E21D 20/02; E21D 20/026; E21D 20/028; E21D 20/003; B65B 29/10

USPC ........ 141/9, 103, 104, 237; 405/259.5, 259.6; 206/219
See application file for complete search history.

(56) References Cited

U.S. PATENT DOCUMENTS 1,676,734 A 7/1928 Nevil
1,828,865 A 10/1931 Nevil
(Continued)

FOREIGN PATENT DOCUMENTS

GB 1323112 7/1973
GB 2274894 A 8/1994

OTHER PUBLICATIONS

Mexican Office Action (with English translation) dated Feb. 20, 2014 for Mexican application No. MX/a/2011/007831, 3 pages.
(Continued)

*Primary Examiner* — Timothy L Maust
(74) *Attorney, Agent, or Firm* — The Webb Law Firm

(57) ABSTRACT

A filling apparatus for a grouting system. The filling apparatus comprises a first fill tube and a second fill tube. The first fill tube is discrete from the second fill tube. The first fill tube is disposed for transporting resin mastic and the second fill tube is disposed for transporting initiator. A portion of the first fill tube has an inlet opening through which an injection quill extends interiorly and downwardly through the first fill tube. The injection quill is disposed for transporting inhibitor. This disclosure also relates to a method for adjusting gel time of a grouting system used for anchoring a reinforcing member in an opening, a grouting system for anchoring a reinforcing member in an opening, and a method for anchoring a reinforcing member in a mine.

18 Claims, 4 Drawing Sheets

(51) Int. Cl.
*F16B 13/14* (2006.01)
*B65B 39/00* (2006.01)

(56) References Cited

U.S. PATENT DOCUMENTS

| | | | |
|---|---|---|---|
| 3,267,971 A | 8/1966 | Mueller | |
| 3,324,662 A * | 6/1967 | McLean | E21D 20/025 405/259.5 |
| 3,474,898 A | 10/1969 | Montgomery | |
| 3,559,700 A | 2/1971 | Erickson | |
| 3,731,791 A * | 5/1973 | Fourcade | C04B 40/0666 206/219 |
| 3,756,388 A * | 9/1973 | Murphy | B65D 81/3261 206/219 |
| 3,861,522 A * | 1/1975 | Llewellyn | C04B 40/065 206/219 |
| 3,881,529 A | 5/1975 | Mannara | |
| 4,105,114 A | 8/1978 | Knox et al. | |
| 4,136,774 A * | 1/1979 | Ghoshal | E21D 20/02 206/219 |
| 4,159,028 A | 6/1979 | Barker et al. | |
| 4,353,463 A * | 10/1982 | Seemann | F16B 13/144 206/220 |
| 4,372,708 A | 2/1983 | Bower, Jr. et al. | |
| 4,402,633 A | 9/1983 | Self | |
| 4,608,810 A * | 9/1986 | Bordini | B65B 9/093 53/551 |
| 4,616,050 A | 10/1986 | Simmons et al. | |
| 4,729,696 A | 3/1988 | Goto et al. | |
| 5,078,704 A | 1/1992 | Wejnar | |
| 5,397,202 A | 3/1995 | Shrader et al. | |
| 5,544,981 A | 8/1996 | Nishida et al. | |
| 5,560,403 A | 10/1996 | Balteau et al. | |
| 5,775,386 A | 7/1998 | Connan | |
| 5,993,116 A | 11/1999 | Paxton et al. | |
| 6,516,838 B2 | 2/2003 | Thibiant et al. | |
| 6,874,544 B2 | 4/2005 | O'Connor et al. | |
| 7,021,032 B2 | 4/2006 | Linner | |
| 7,775,745 B2 * | 8/2010 | Simmons | E21D 20/026 405/259.5 |
| 8,016,003 B2 | 9/2011 | Bullen | |
| 8,539,992 B2 * | 9/2013 | Jones | B65B 29/10 141/103 |
| 2008/0307937 A1 | 12/2008 | Simmons et al. | |
| 2010/0183379 A1 | 7/2010 | Simmons et al. | |

OTHER PUBLICATIONS

Mexican Office Action (with English translation) dated Sep. 25, 2013 for Mexican application No. MX/a/2011/007831.

European Office Action dated Jul. 4, 2012 from corresponding EP 12002889.9-2308.

Patent Examination Report No. 1 dated Sep. 1, 2014 from corresponding Australian Patent Application No. 2012201361, pp. 4.

* cited by examiner

APPARATUS AND METHOD FOR ANCHOR BOLT GROUTING

RELATED APPLICATION

This application is a divisional application of U.S. patent application Ser. No. 13/095,727, filed Apr. 27, 2011, which is incorporated herein by reference in its entirety.

BACKGROUND

1. Field of the Disclosure

This disclosure relates to a filling apparatus for a grouting system, a method for adjusting gel time of a grouting system used for anchoring a reinforcing member, e.g., bolts and other supports, in a mine, a grouting system for anchoring a reinforcing member in a mine, and a method of anchoring a reinforcing member in a mine.

2. Discussion of the Background Art

Anchor bolts are employed in various fields of engineering, for example, as strengthening or reinforcing members in rock formations and in structural bodies. The bolts are inserted into drill holes in the formation or body, and often are fixed or anchored, at their inner end or over substantially their entire length, by means of a reactive chemical grouting composition that hardens around the bolt. When used in a mine roof, bolts grouted in this manner help significantly to prevent mine roof failure.

A chemical anchor grouting composition can contain a polyester resin mastic and an initiator separated by barrier until time of use. Such a two component chemical anchor grouting composition is typically placed in boreholes using tubular compartmented capsules, also known as resin cartridges. A bolt is inserted in the hole and rotated which ruptures the cartridge and allows the two components to mix. The bolt is held in position until the resin grout sets to permanently hold the bolt in place. It is sometimes advantageous to the rock reinforcement to apply a tension load to a bolt after it is installed.

For a bolt that uses a resin grout composition to secure it and the grout covers the entire length of the bolt, and there is a need to place part of the bolt in tension, than a grouting composition with two gel times is required. A fast gel time resin is used in the inner end of the hole to set quickly and grout approximately half of the bolt. A slow gel time resin grout is used in the remainder of the hole. The sequence for installation in a typical resin grouted bolt to be pre-tensioned is to spin the bolt to mix the two components of a resin cartridge, wait for the fast resin to set to secure the bolt in position, use a mechanical tensioning device such as a threaded coupler or nut to apply a tension load to the bolt, and then the slower resin grout sets to secure the remainder of the bolt and prevent the tension force from bleeding off.

Mining and tunneling industries have traditionally used two cartridges of resin grout for anchor bolts that are pre-tensioned, with one cartridge being fully a fast gel time resin and one cartridge being fully a slow gel time resin. It is advantageous for the end user to be able to install a single cartridge that contains both a fast and slow gel time resin grouts instead of having to maintain and install both a fast and a slow resin cartridge. A single resin cartridge with both a fast and slow component, often described as a two-speed cartridge, has been used for a number of years. The most common method for manufacturing a two-speed cartridge is to have two alternating pumps supplying a portion of the cartridge with fast resin mastic and then the remainder as slow resin mastic. That method requires capital investment for two sets of mixing and pumping equipment for manufacturing a two-speed cartridge.

For example, two-speed resin cartridges are conventionally produced by making two resin mastics at different gel times and then using an alternating pumping system that switches the resin feed to the cartridge fill tube back and forth between the resin mastics of two different gel times. The disadvantage to the conventional method is the resin mastic is difficult to pump and a dual pumping system is expensive for initial setup and maintenance. Two setups of the full pumping systems are required to make a chemical anchor with two gel times. The ingredient cost is also higher for a two gel time cartridge because a higher purity white ground calcium carbonate is used for the filler; so that, one of the resin mastics can be fully colored to indicate the different gel times in the cartridge. Resin mastic made with a lower cost gray ground calcium carbonate cannot be colored due to the black influence of impurities in the calcium carbonate.

There is a need in the art for a low cost cartridge with two gel times in the same cartridge. There is a need to clearly show in such cartridges which end of the cartridge has the slow gel time so as to prevent incorrect installation in a mine. There is also a need in the art for a cost effective cartridge filling system that does not require multiple resin pumps, e.g., pumps for fast resin mastic and slow resin mastic.

The present disclosure provides many advantages, which shall become apparent as described below.

SUMMARY

This disclosure relates in part to a filling apparatus for a grouting system. The filling apparatus comprises a first fill tube and a second fill tube. The first fill tube is discrete from the second fill tube. The first fill tube is disposed for transporting resin mastic and the second fill tube is disposed for transporting initiator. A portion of the first fill tube has an inlet opening through which an injection quill, extends interiorly and downwardly through the first fill tube. The injection quill is disposed for transporting inhibitor.

This disclosure also relates in part to a filling apparatus for a grouting system. The filling apparatus comprises a package includes a tubular member formed of a polyester film and having a first compartment and a second compartment. The first compartment is discrete from the second compartment. The first compartment is disposed for containing resin mastic and inhibitor and the second compartment is disposed for containing initiator. A first fill tube is operatively connected to the first compartment for delivery of resin mastic into the first compartment. A second fill tube is operatively connected to the second compartment for delivery of initiator into the second compartment. A first fill line is operatively connected to the first fill tube for delivery of resin mastic into the first fill tube. A second fill line is operatively connected to the second fill tube for delivery of initiator into the second fill tube. A portion of the first fill tube has an inlet opening through which a third fill line extends interiorly and downwardly through the first fill tube. The third fill line is operatively connected to the first compartment for delivery of inhibitor into the first compartment.

This disclosure further relates in part to a method for adjusting gel time of a grouting system used for anchoring a reinforcing member in an opening. The method comprises providing a grouting system comprising a package. The package comprises a tubular member formed of a polyester film and has a first compartment and a second compartment. The first compartment is discrete from the second compartment. A resin, mastic is disposed in the first compartment and an initiator is disposed in the second compartment. Pigmented inhibitor is added to the resin mastic disposed in the first compartment sufficient to make the inhibitor visible in the resin mastic. The amount of pigmented inhibitor added to the resin mastic disposed in the first compartment is controlled sufficient to provide a predetermined amount of resin mastic with pigmented inhibitor and a predetermined amount of resin mastic without pigmented inhibitor.

This disclosure yet further relates in part to a grouting system for anchoring a reinforcing member in an opening. The grouting system comprises a package. The package comprises a tubular member formed of a polyester film and has a first compartment and a second compartment. The first compartment is discrete from the second compartment. A resin mastic is disposed in the first compartment and an initiator is disposed in the second compartment. A pigmented inhibitor is disposed in the first compartment adjacent to the polyester film sufficient to make the inhibitor visible in the resin mastic.

This disclosure also relates in part to a method of anchoring a reinforcing member in a mine. The method comprises providing a grouting system comprising a package. The package comprises a tubular member formed of a polyester film and has a first compartment and a second compartment. The first compartment is discrete from the second compartment. A resin mastic is disposed in the first compartment and an initiator is disposed in the second compartment. A pigmented inhibitor is disposed in the first compartment adjacent to the polyester film sufficient to make the inhibitor visible in the resin mastic. The package is inserted into a borehole so that an end of the first compartment without pigmented inhibitor abuts a closed end of the borehole. The reinforcing member is inserted into the borehole sufficient to puncture the package and mix the resin mastic, initiator and inhibitor. The reinforcing member is then held stationary for a first period of time.

An advantage of this disclosure is that it provides a low cost cartridge with two gel times in the same cartridge. The pigmented inhibitor is clearly visible in such cartridges showing which end of the cartridge has the slow gel time so as to prevent incorrect installation in a mine. The cartridge filling system of this disclosure is cost effective in that it does not require multiple resin pumps, e.g., pumps for fast resin mastic and slow resin mastic. Other advantages include the use of a low cost method to inject into the higher pressure resin mastic compartment, use of an injection quill so that the pigmented inhibitor is clearly visible without fully mixing it into the resin mastic allowing for the use of the lower cost gray calcium carbonate filler, and use of a vacuum system that provides for a more distinct transition area between the slow and fast sections of the two-speed cartridge.

Further objects, features and advantages of the present disclosure will be understood by reference to the following drawings and detailed description.

DETAILED DESCRIPTION PREFERRED EMBODIMENT

Figure 1:
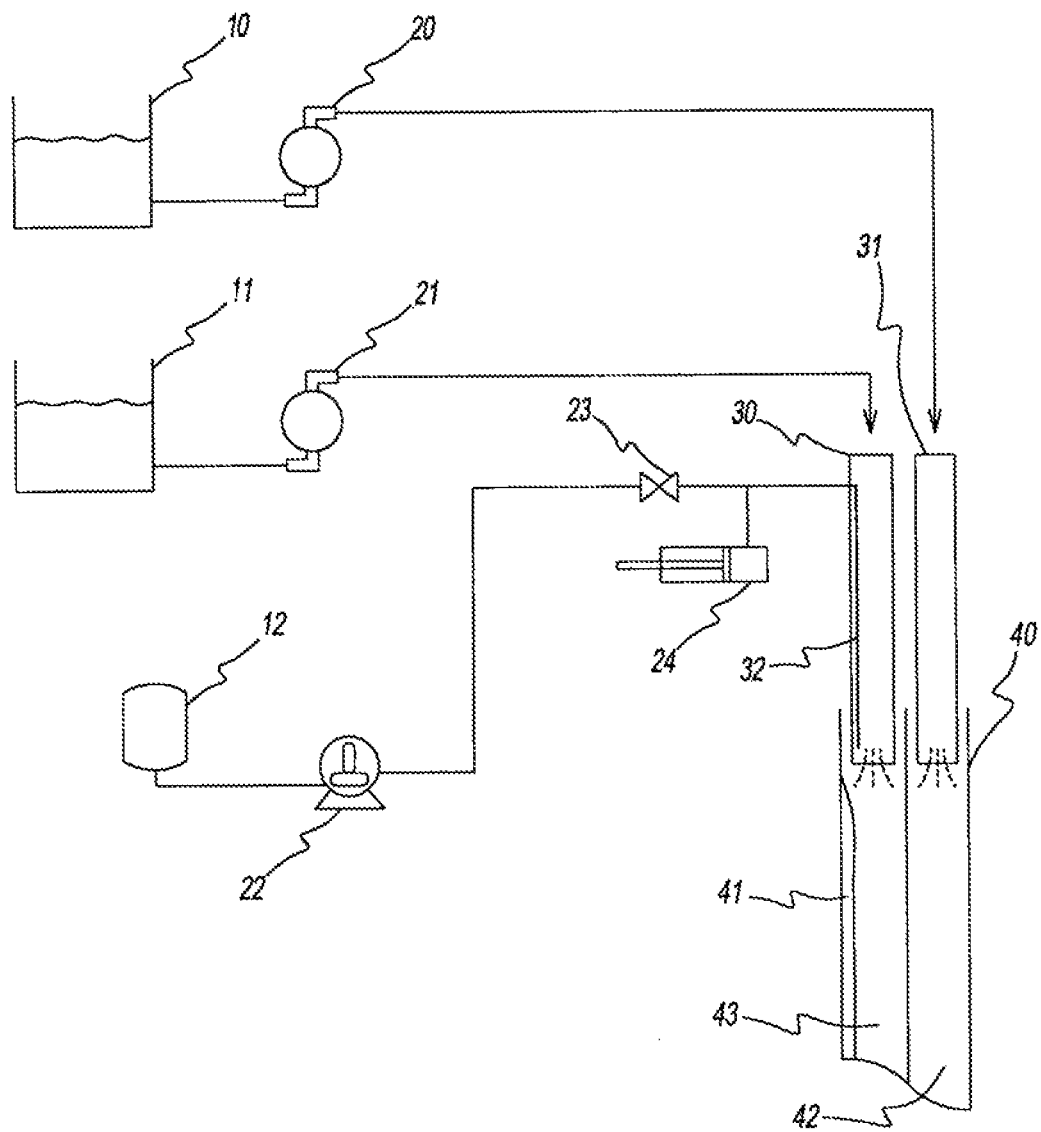
FIG. 1 is a schematic diagram of a filling apparatus for a grouting system in accordance with this disclosure.

As used herein, the term "mastic" means liquid component with filler. For example, there can be resin mastic (liquid component plus filler) as well as catalyst mastic (liquid component plus filler).

As used herein, the terms "grouting," "grouting system," "grout," and "grout system" mean a substance that hardens to anchor a reinforcing member in a space. For example, grouting can be provided in the form of a cartridge with a compartment housing a polyester resin and a compartment housing an initiator/catalyst, such that when the cartridge is shredded and the resin is mixed with the initiator/catalyst, a reinforcing member can be anchored in a space.

As used herein, the terms "injection quill" and "third fill line" are used interchangeably and refer to the same fill line or tubing.

This disclosure relates to a resin grout cartridge which contains two different gel times of resin mastic and a method of manufacture thereof. The method involves injecting an inhibitor into the resin mastic side of the form-and-fill hardware of a resin mastic cartridge packaging machine. The inhibitor is mixed with a pigment dispersion prior to injection to clearly show which end of the cartridge has the slow gel time. The pigment is used by the packaging operator as a visual indicator of how much of the resin cartridges contains the slow gel mastic. The method includes a vacuum system used to stop the injected inhibitor flow after the injection valve is closed to create a distinct transition between the slow and fast gel time mastics. The pigmented inhibitor is a tool for easy identification by the end user of the slow end of the resin mastic capsule. The pigment color is chosen to be bright and easily distinguishable in a dark mining or tunneling environment to prevent the incorrect installation of the resin grouting capsule.

In an embodiment, the method of adjusting gel time of a grouting system used for anchoring a reinforcement in a mine includes adding pigmented inhibitor to resin mastic of the grouting system, the pigmented inhibitor and resin mastic being disposed together in a first compartment of a multi-compartment frangible package. The resin mastic may be polyester with a styrene monomer cross-linking agent. The pigmented inhibitor may be a free radical inhibitor, for example, toluhydroquinone and hydroquinone with a colorant, e.g., pigment. The grouting system may further include an initiator in a second compartment of the multi-compartment frangible package. The initiator may be catalyst mastic. The initiator may be a free radical generating component such as benzoyl peroxide. The amount of pigmented inhibitor added to the resin mastic in the first compartment is controlled to provide a predetermined amount of resin mastic with pigmented inhibitor and a predetermined amount of resin mastic without pigmented inhibitor.

In another embodiment, the method of adjusting gel time of a resin-catalyst system used for anchoring a reinforcement in a mine includes adding inhibitor to resin mastic separated from catalyst mastic in the system, and controlling the amount of pigmented inhibitor added to the resin sufficient to provide a predetermined amount of resin mastic with pigmented inhibitor and a predetermined amount of resin mastic without pigmented inhibitor.

In another embodiment, the grouting system for anchoring a reinforcement in a mine includes a package that is a tubular member formed of polyester film and having discrete first and second compartments. A resin mastic and inhibitor are disposed in the first compartment, and a catalyst mastic is disposed in the second compartment. The catalyst mastic may include benzoyl peroxide. The inhibitor may be hydroquinone. The grouting system may further include a colorant mixed with the inhibitor in the first compartment, and the colorant may be a pigment. The resin mastic may be an unsaturated polyester with a styrene monomer cross-linking agent. The first compartment may have a first portion in which both resin mastic and inhibitor are disposed and a second portion in which resin mastic is disposed substantially without inhibitor. At least one of the catalyst mastic and resin mastic may include filler, e.g., limestone. A pigmented inhibitor is disposed in the first compartment adjacent to the outer wall sufficient to make the inhibitor visible in the resin mastic. Such a two-speed grouting system is particularly useful for torque tensioned bolt systems.

In the grouting system, the pigmented inhibitor is preferably disposed in the first compartment adjacent to the polyester film as a longitudinal strip having a width sufficient to make the inhibitor visible in the resin mastic. The longitudinal strip preferably has a width of from about 0.1 to about 1.0 inch.

In an embodiment, the method of anchoring a reinforcement in a mine includes providing a borehole and inserting a capsule in the borehole. The capsule has a first section with resin mastic and inhibitor therein and a second section with catalyst mastic therein. The inhibitor is substantially disposed in only a portion of the resin mastic in the first section. A reinforcement is inserted in the borehole to puncture the capsule and spun to mix the resin mastic, catalyst mastic, and inhibitor. The reinforcement is held stationary for a first period of time. The capsule is always inserted into the borehole first, followed by the reinforcement. The method may further include tensioning the reinforcement after the first period of time, and before the time that the resin mastic with inhibitor sets.

The anchoring method further comprises spinning the reinforcing member sufficient to puncture the package and mix the resin mastic, initiator and inhibitor, in an embodiment, the capsule is inserted into the borehole first, followed by the reinforcing member. In another embodiment, tensioning the reinforcing member can occur after the first period of time.

This disclosure provides a method for changing the gel time of a grouting system by adding an inhibitor solution to the resin mastic component of a two component system. The inhibitor solution is added during the form-and-fill manufacturing process of the two component grouting system. The method of adding the inhibitor solution can be controlled in such a way as to create both a fast get time area and a slow gel time area within the same unit. Further, the method allows for a distinct and visible division between the fast gel time area and the slow gel time area of the grouting system.

The pigmented inhibitor is preferably disposed in the first compartment adjacent to the polyester film as a longitudinal strip having a width sufficient to make the inhibitor visible in the resin mastic. The longitudinal strip preferably has a width of from about 0.1 to about 1.0 inch. The amount of pigmented inhibitor added to the resin, mastic disposed in the first compartment is controlled sufficient to discretely segregate the resin mastic with pigmented inhibitor from the resin mastic without pigmented inhibitor. As described herein, a vacuum generator is operatively connected to the third fill line and is used for quickly stopping the flow of pigmented inhibitor added to the resin mastic disposed in the first compartment sufficient to discretely segregate the resin mastic with pigmented inhibitor from the resin mastic without pigmented inhibitor.

The resin cartridge useful in this disclosure is composed of a chemical grouting composition, and a shell to contain the chemical grouting composition. The chemical grouting composition comprises a first component and a second component. The first component comprises, for example, an unsaturated polyester, a cross linking agent, and solid particulates. The second component comprises, for example, peroxide, a liquid that comprises water, and solid particulates. The shell is generally composed partially of, or entirely of, a thin polyester film, such as polyester terephthalate (PET). Component one and component two are designed to react with each other and form a solid state when mixed with each other under suitable conditions. The container of polyester film is compartmentalized so that the first component is isolated in one compartment and the second component is isolated in the second compartment. The reactive grouting composition and the polyester film shell are collectively referred to as a resin cartridge.

The first component and the second component of the resin cartridge generally remain isolated in their separate compartments in the polyester film up to the time of use. The use of a resin cartridge typically involves creating a borehole by drilling into a substrate, such as rock or concrete. A resin cartridge is loaded into the borehole and then a reinforcing member, typically a steel rod with an irregular surface profile, is forced into the borehole and rotated by hand or mechanical means. As the steel member is forced into the borehole and rotated, the thin polyester film shreds, exposing and mixing component one with component two. The components react with each other and form a solid state around the reinforcing member, thus fixing said reinforcing member in the borehole.

This invention provides a simplified method for making a resin cartridge with two gel times, also called a two-speed cartridge, by controlling when the pigmented inhibitor solution is injected in the resin mastic as it flows into the polyester film shell. The first gel time in the cartridge is the gel time of the uninhibited resin mastic. The second gel time of the cartridges is the gel time of the inhibited resin mastic. The proportions of the two gel times in the cartridge can be controlled by the on and off timing of the pigmented inhibitor injection valve.

This disclosure offers several advantages including 1) using a low cost method to inject into the higher pressure resin mastic compartment, 2) utilizing an injection quill so that the pigmented inhibitor is clearly visible without fully mixing it into the resin mastic allowing for the use of the lower cost gray calcium carbonate filler, and 3) utilizing a vacuum system that provides for a more distinct transition area between the slow and fast sections of the two-speed cartridge.

FIG. 1 shows an exemplary embodiment of an apparatus of this disclosure. Catalyst mastic from tank 10 is pumped by diaphragm pump 20 through catalyst fill tube 31. The two compartment polyester film shell 40 is continuously being formed around both catalyst fill tube 31 and resin fill tube 30. The catalyst compartment 42 is filled with catalyst mastic from catalyst fill tube 31. Resin mastic from tank 11 is pumped by diaphragm pump 21 through resin fill tube 30. The resin mastic compartment 43 is filled with resin mastic from the resin fill tube 30.

A premixed pigmented inhibitor solution is stored in tank 12. To add pigmented inhibitor solution to the resin mastic compartment 43, inhibitor injection valve 23 opens and metering pump 22 delivers inhibitor through injection quill 32. The injection quill 32 may extend slightly past the end of the resin fill tube 30 or may end inside resin fill tube 30. Pigmented inhibitor is positioned next to the polyester film shell so that a layer of pigment inhibitor 41 may be seen from the exterior of the polyester fill jacket. The pigment inhibitor pump 22 and valve 23 may run continuously to manufacture a cartridge of one gel time or it may be cycled off and on to produce a cartridge with two gel times. A cartridge with two gel times requires a method to quickly stop the pigmented inhibitor injection to produce a distinct transition between the portion of the resin mastic that contains the pigmented inhibitor and the portion that does not. A vacuum generating cylinder 24 is used to stop the flow of inhibitor though injection quill 32 to create a distinct cut off of the pigmented inhibitor in the resin mastic.

Injection quill 32 runs down the inside of resin fill tube 30. In FIG. 1, injection quill 32 is shown extending past the end of resin fill tube 30 (Position 1). The preferred position is approximately 1½" from the end of resin fill tube 30 (Position 2) to get improved pigmented inhibitor coverage over the outside of the resin mastic. Position 1 produced a visible stripe of pigmented inhibitor approximately ¼' wide in resin compartment 43 with injection quill 32 extending past the end of resin fill tube 30. Position 2 produced a visible stripe of pigmented inhibitor approximately ¾" wide in resin compartment 43 when injection quill 32 stopped approximately 1½" from the end of resin fill tube 30. In Position 2, injection quill 32 was also silver soldered near its end to the inside of the resin fill tube 30 to allow the pigmented inhibitor to be injected between the inside wall of resin fill tube 30 and the resin mastic flow. The pigmented inhibitor is a much lower viscosity (less than 5000 cps) than the resin mastic (greater than 300,000 cps) so that the highly viscous resin mastic pushes and spreads the pigmented inhibitor before it exits the end of resin fill tube 30. The spreading action is why pigmented inhibitor in Position 2 produced a wider strip.

Figure 3:
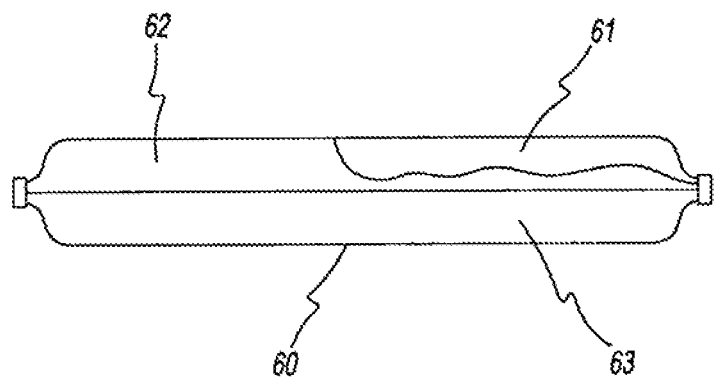
FIG. 3 is a drawing of a resin cartridge showing pigmented inhibitor in part of the resin mastic compartment.

There are two compartments in the polyester film, i.e., the resin mastic compartment 43 and the catalyst mastic compartment 42. The pigmented inhibitor is located in the resin compartment 43. The pigmented inhibitor and the resin mastic tend not to mix because of the widely different viscosities and the position of injection quill 32 between the resin mastic flow and the inside of resin fill tube 30. In FIG. 3, the pigmented inhibitor 61 covers most of the black resin mastic 62 in the slow end of the resin cartridge. The pigmented inhibitor 61 has not covered all of the black resin mastic 62. Most of the pigmented inhibitor visible strip is less than 1 mm in depth.

Figure 2:
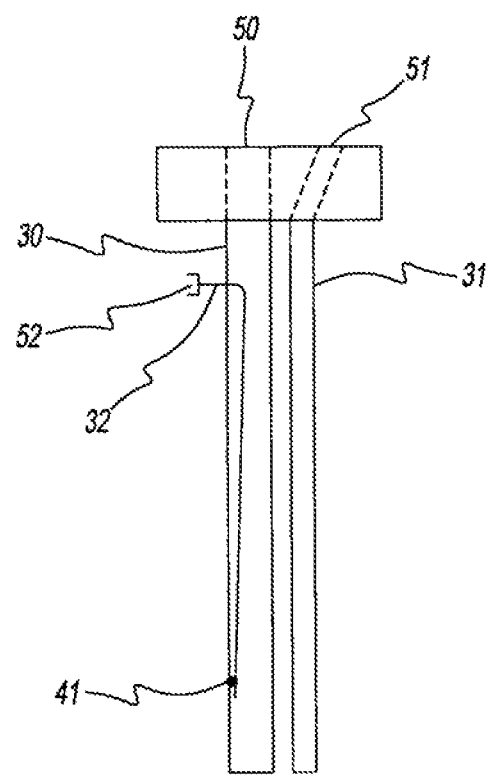
FIG. 2 is a drawing of the fill hardware assembly in accordance with this disclosure.

Referring to FIG. 1, injection quill 32 is preferably ⅛" stainless steel tubing. Injection quill 32 is positioned on the inside of resin fill tube 30. FIG. 2 shows a fill hardware assembly. The injection quill 32 enters resin fill tube 30 and then runs down the inside of resin fill tube 30 until almost the end of the tube. The end of injection quill 32 is located near the end of resin fill tube 30 so that the injection pump can operate at less pressure. The pressure of the resin mastic flowing through resin fill tube 30 drops as it approaches the end of the tube.

FIG. 2 shows a fill hardware assembly in accordance with this disclosure. The injection quill 32 enters resin fill tube 30 and then runs down the inside of resin fill tube 30 until almost the end 32a of the tube. The end of injection quill 32 is located near the end 32a of resin fill tube 30 so that the injection pump can operate at less pressure. The pressure of the resin mastic flowing through resin fill tube 30 drops as it approaches the end of the tube. Pigmented inhibitor enters injection quill 32 through inlet 52. Catalyst mastic enters catalyst fill tube 31 through inlet 51. Resin mastic enters resin fill tube 30 through inlet 50.

FIG. 3 shows resin cartridges 60 having pigmented inhibitor 61 and resin mastic 62. The pigmented inhibitor 61 covers almost all of the black resin mastic 62 in the slow end of the resin cartridge, but some resin mastic is visible along the edge of the cartridge, the pigmented inhibitor 61 has not covered all of the black resin mastic 62. Most of the pigmented inhibitor 61 visible strip is less than 1 mm in depth. The catalyst mastic 63 is separated from the resin mastic 62 by the polyester film.

Figure 4:
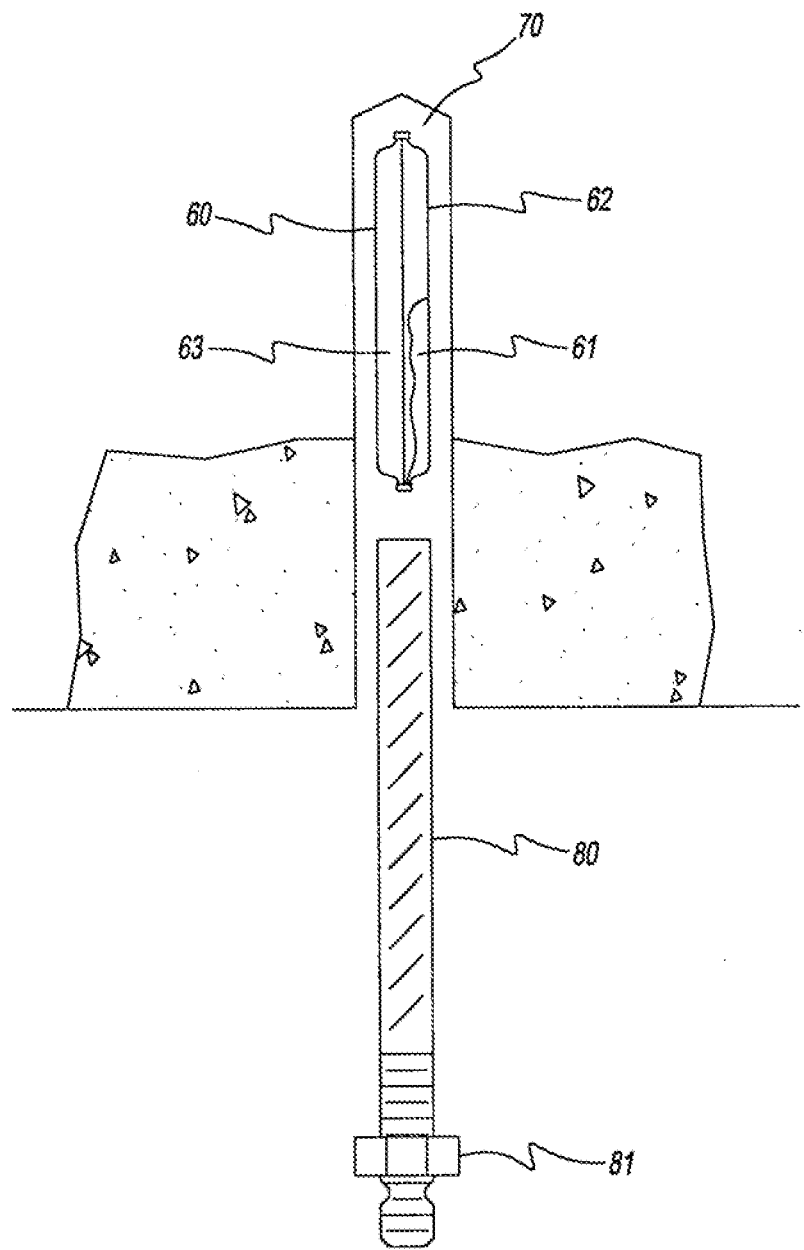
FIG. 4 is a drawing of a two-speed resin cartridge positioned in a borehole prior to the reinforcing member being inserted.

FIG. 4 shows resin cartridge 60 having pigmented inhibitor 61 and resin mastic 62 and catalyst mastic 63. Resin cartridge 60 is positioned in borehole 70. A reinforcing member 80 that has a nut 81 for tensioning is shown in the "ready to be inserted." position. During insertion, the reinforcing member 80 would puncture the resin cartridge 60 in the borehole 70.

In an embodiment, the filling apparatus includes a first fill tube and a second fill tube. The first fill tube is discrete from the second fill tube. The first fill tube is disposed for transporting resin mastic and the second fill tube is disposed for transporting initiator. A portion of the first fill tube has an inlet opening through which an injection quill extends interiorly and downwardly through the first fill tube. The injection quill is disposed for transporting inhibitor.

The filling apparatus can further include a package comprising a tubular member formed of a polyester film and having a first compartment and a second compartment. The first compartment is discrete from the second compartment. The first compartment is disposed for containing resin mastic and inhibitor and the second compartment is disposed for containing initiator. The first fill tube is operatively connected to the first compartment for transporting resin mastic into the first compartment. The second fill tube is operatively connected to the second compartment for transporting initiator into the second compartment. The injection quill is operatively connected to the first compartment for transporting inhibitor into the first compartment.

The filling apparatus can further include a first fill line operatively connected to the first fill tube for transporting resin mastic into the first fill tube. A second fill line is operatively connected to the second fill tube for transporting initiator into the second fill tube.

A vacuum generator can be operatively connected to the injection quill or third fill line for quickly stopping the flow of pigmented inhibitor added to the resin mastic disposed in the first compartment. The vacuum generator operates sufficient to discretely segregate the resin mastic with pigmented inhibitor from the resin mastic without pigmented inhibitor. For example, an on-off vacuum system can be used to pull a small vacuum on the injection quill after the inhibitor flow control valve is closed. The purpose of the vacuum is to eliminate dripping of the pigmented inhibitor solution from the injection quill caused by either gravity or the venturi effect of the resin mastic flow past the injection quill. The vacuum can be created by using a small hydraulic cylinder as a piston in a tube to pull the vacuum after the inhibitor flow control valve is closed.

In an embodiment, the first fill tube comprises a sidewall member configured to form an internal compartment. The third fill line is disposed in the first fill tube adjacent to the sidewall member. The third fill line extends interiorly and downwardly through the first fill tube to about 0.5 inches to about 3.0 inches from the end of the first fill tube.

The first fill line contains a pump for transporting resin mastic therethrough. The second fill line contains a pump for transporting catalyst mastic therethrough.

The filling apparatus can further include a first vessel for storing resin mastic. The first fill line connects the first vessel to the first fill tube. The filling apparatus can also include a second vessel for storing catalyst mastic. The second fill line connects the second vessel to the second fill tube. The filling apparatus can further include a third vessel for storing inhibitor. The third fill line connects the third vessel to the first fill tube.

The two-speed grouting systems of this disclosure are useful for anchoring mine bolts and tendons to provide roof and side wall support in mines. In particular, the grouting systems of this disclosure are provided in capsules which are inserted into boreholes and subsequently punctured in a manner such that the contents are mixed and then allowed to solidify. The capsules include two compartments, i.e., a resin compartment a and an initiator compartment. The resin and initiator are segregated from one another in the capsule so that reaction is prevented prior to puncturing of the compartments. The use of two-speed grouting systems permits bolt pre-tensioning.

In order to puncture the capsule so that the contents of the compartments may be released and mixed, a bolt (or other reinforcing member) abutting a capsule, for example, may be rotated in place to shred the capsule, mix the components, and permit solidification of the mastic. The capsule is inserted into the borehole so that the "faster" end abuts the top of the hole thereby permitting a bolt inserted into the borehole to be anchored by the solidified mastic at the top of the hole first. The orientation of the capsule in the borehole ("faster" end inserted first) is important to the success of the anchoring medium to provide support. In particular, once the bolt has been anchored at the top of the borehole, a nut may be tightened at the opposite end of the bolt to apply a compressive force to an associated support plate abutting the mine roof surface to in turn compress the sagging mine root.

In order to successfully compress the region of the mine roof adjacent the bolt, the mastic should not anchor the bolt except at the top end of the borehole, until after the nut has been sufficiently torqued. Only then should the "slower" speed resin disposed toward the other end of the bolt fully solidify to anchor the remaining portion of the bolt. In order to distinguish which end of a capsule contains the slower speed resin, a colorant is added to the resin as an identifying feature. Such pigmenting or coloration thus serves as indicia of gel time.

The capsules useful in this disclosure range in lengths from 2 feet to 6 feet and in diameter from ¾ inch to 1¼ inch. Such capsules are commercially available.

The resins, e.g., polyesters, useful in this disclosure have a known gel time. An inhibitor is added to at least a portion of the resin to slow down the gel time. The gel time of the resin is the time for the resin to set up, e.g., typically from about 10 seconds to about 2 minutes. As used herein, the gel time of a resin formulation is the time that elapses between the mixing of the reactive components and the hardening or stiffening of the resin in the mixture (e.g., the mixture of resin and initiator/catalyst).

As used herein, the cure time of a resin formulation is the time required for the composition to achieve full strength, or a high percentage of its final strength, with a desirable goal being that the composition attains about 80% of its final strength in approximately 10 times the gel time of the resin mastic. The cured resin column and the reinforcing member are held in position by a mechanical interlocking between the resin column and the rough texture of the wall of the borehole.

The primary roof support systems used in coal mines include headed rebar bolts typically 4 feet to 6 feet in length, ¾ inch and ⅝ inch in diameter and used in conjunction with resin grouting in 1 inch diameter holes. As roof support or other stabilization becomes more difficult, then sophisticated members, such as tensionable anchor bolts, are used. Two-speed resin cartridges are designed to be used with tensionable anchor bolts. In accordance with this disclosure, grouting is accomplished using multi-compartment resin cartridges. The multi-compartment cartridges are designed to keep the polymerizable resin and catalyst separate from each other until the cartridge, when inserted in a borehole, is intentionally ruptured by a mine roof bolt that also is inserted in the borehole. When the resin and catalyst are mixed (by virtue of rupture as well as spinning of the bolt in the borehole) and subsequently harden, the bolt is held in place.

An advantage of adding inhibitor to the resin in the grouting systems used for mine roof supports relates to the significant differences in the viscosities of the resin and inhibitor. At a given shear rate of measurement, the viscosity of the resin used in such grouting systems is substantially greater than the viscosity of the inhibitor, i.e., the resin generally is much thicker than the inhibitor. When a resin cartridge is filled, the inhibitor preferentially disperses toward the resin fill tube wall, not only because of the injection quill position in the resin fill tube, but because the inhibitor is less viscous than the resin. This results in less inhibitor mixed into the resin mastic thereby increasing visibility of the pigmented inhibitor.

Illustrative resins for use with the grouting systems of this disclosure include, for example, polyester with a styrene monomer cross-linking agent as well as acrylates and acrylic resins and combinations thereof, unsaturated polyester resins dissolved in a suitable ethylenically unsaturated monomer or mixture of monomers such as styrene, alpha methyl styrene, vinyl toluene, and methyl methacrylate. Illustrative resins are disclosed in U.S. Pat. No. 3,731,791 and U.S. Pat. No. 7,411,010 B2, the disclosures of which are incorporated herein by reference.

Illustrative catalysts for use with the grouting systems of this disclosure include, for example, peroxide types such as benzoyl peroxide (BPO) with a water or oil base. Other such initiators include cyclohexane peroxide, hydroxy heptyl peroxide, 1-hydroxy cyclohexyl hydroperoxide-1, t-butyl hydroperoxide, 2,4-dichlorobenzoyl peroxide and the like, methyl ethyl ketone peroxide as well as inorganic peroxides alone or mixed with organic peroxides, such as sodium percarbonate, calcium peroxide, sodium peroxide. Illustrative initiators are disclosed in U.S. Pat. No. 3,324,663, the disclosure of which is incorporated herein by reference. As used herein, the terms "catalyst" and "initiator" mean a substance that initiates polymerization and optionally is consumed during polymerization.

Illustrative inhibitors for use with the grouting systems of this disclosure include, for example, toluhydroquinone (THQ), as well as hydroquinone (HQ), monoalkyl phenols, including monotertiary butyl phenol, monotertiary butyl hydroquinone, ortho-, meta- and para-cresol, higher alkyl phenols, polyhydric phenols, including catechol resorcinol, and the partially alkylated polyhydric phenols, including eugenol, guaiacol, and mixtures thereof. Illustrative inhibitors are disclosed in U.S. Pat. No. 3,324,663, the disclosure of which is incorporated herein by reference. Other free radical inhibitors also can be used. As used herein, the term "inhibitor" means a substance that decreases the rate of polymerization.

Inhibitors useful in this disclosure include free radical scavengers, for example, hydroquinone and toluhydroquinone. Hydroquinone is a preferred inhibitor because of its effectiveness per dose and lower cost than other inhibitors. Quinones are solids and are typically supplied in a solvent carrier such as a glycol, styrene, or a polyester resin. Inhibitors are commercially available in solutions from less than 5% to approximately 25%.

Illustrative colorants for the pigmented inhibitors useful in the grouting systems of this disclosure include, for example, organic and inorganic pigments, dyes, colored glass spheres, and colored fillers. The colorant is chosen to be bright and easily distinguishable in a dark mining or tunneling environment to prevent the incorrect installation of the resin cartridge.

Illustrative fillers for use with the grouting systems of this disclosure include, for example, limestone, fly ash, sand, dolomite, and talc. Illustrative fillers are disclosed in U.S. Pat. No. 4,280,943, the disclosure of which is incorporated herein by reference.

In an embodiment of a manufacturing operation, two pumps are provided for producing a two-speed resin system cartridge. In particular, referring to FIG. 1, a first pump 21 is provided for delivering resin mastic while a second pump 20 is provided for delivering catalyst mastic. Inhibitor may be added by a metering pump 22, for example, to half (or other amount) of the resin section of the cartridge to obtain the desired two speeds. Inhibitor valve 23 can be opened and closed to add inhibitor to a portion of the stream of resin mastic so that resin mastic compartment 43 is filled in part with an inhibitor. The injection quill 32 enables the pigmented inhibitor to be disposed along the outer periphery of resin compartment 43 so that it is visible in the resin mastic.

It is important to be able to recognize which end of the two-speed grouting capsule provides a "faster gel time" and which end provides a "slower gel time." While the film package that forms the cartridge can be marked or color-coded at each end, there is a risk that during manufacturing the wrong film color can be assigned to a particular gel time. The danger is that in the field, a user may have been trained to always insert a cartridge into a borehole with a particular colored end first, but during manufacture the wrong "speed" was associated with that end. As a result, the resin mastic is cleared colored with a pigment in accordance with this disclosure to clearly identify the faster gel time end and the slower gel time end of the cartridge.

Instead of coloring all of the resin mastic in the slow gel time end of the cartridge, simpler manufacturing techniques to control gel time as described and reduced ingredient amounts can be used to only color the inhibitor. The colored inhibitor is then purposely positioned as a thin layer on top of a portion of the resin mastic.

In accordance with this disclosure, the colored inhibitor is added to the resin compartment so that the inhibitor is visible in the resin compartment. The injection quill may extend slightly past the end of the resin fill tube or may end inside the resin fill tube. Pigmented inhibitor is positioned next to the polyester film shell so that a layer of pigment inhibitor may be seen from the exterior of the resin compartment.

An exemplary procedure for using the two-speed resin systems described herein for anchoring mine bolts and tendons to provide roof and side wall support in mines is described below. A borehole is drilled to a desired diameter (to provide a desired annulus) and length as specified by a manufacturer of a given reinforcement (e.g., a bolt or tendon). A two speed resin cartridge is inserted into the borehole, with the "faster" end inserted first. A reinforcement is inserted into the borehole that punctures the resin capsule. The reinforcement is spun 30 to 50 revolutions to shred the capsule and mix the contents thereof. The reinforcement is held stationary to allow the gel time of the faster end to elapse and the faster end to set. The reinforcement undergoes pretensioning after the "faster" end sets but before the "slower" end sets to provide desired tensioning. The slower end is allowed to set to create a desired pre-stress load on a portion of the reinforcement.

While various descriptions of the present invention are described above, it should be understood that the various features can be used singly or in any combination thereof. Therefore, this invention is not to be limited to only the specifically preferred embodiments depicted herein.

Further, it should be understood that variations and modifications within the spirit and scope of the invention may occur to those skilled in the art to which the invention, pertains. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims Various modifications and variations of this disclosure will be obvious to a worker skilled in the art and it is to be understood that such modifications and variations are to be included within the purview of this application and the spirit and scope of the claims.

EXAMPLES

Lab work was done to determine inhibitor amounts to adjust a fast resin mastic gel time to a slow resin mastic gel time. A batch of resin mastic with a gel time of 10 to 14 sec and 84 to 87% filler was used for the experiment. Table 1 shows the amount of inhibitor hand mixed into the resin mastic and the corresponding gel time results. The relationship of amount of inhibitor to corresponding gel times appears to be close to linear.

TABLE 1

| | % Inhibitor to resin mastic | | | | |
| --- | --- | --- | --- | --- | --- |
| | 0.0075% | 0.0150% | 0.0300% | .0450% | .0500% |
| Gel time in sec with Hydroquinone (HQ) | 32.6 | 50.0 | 69.0 | 94.0 | 108.0 |
| Gel time in sec with Toluhydroquinone (THQ) | 28.2 | 46.4 | 62.0 | 82.0 | |

A highly visible pigment dispersion was found to provide a method to make the inhibitor solution visible in the resin cartridge. The pigment dispersion had to be miscible with the inhibitor solution. Experiments for phase separation were run with 50/50 mixtures of inhibitor solutions and pigment dispersions in glycol, plasticizer, and polyester. A pigment dispersion in polyester and an inhibitor dissolved in polyester were chosen for least phase separation. The inhibitor strength of the pigmented inhibitor solution is between 3% and 15% hydroquinone, with a preferred range of 4% to 6%.

The pigmented inhibitor solution is injected into the resin mastic feed stream on a form-and-fill, cartridge packaging machine. The injection point is just prior to where the resin mastic flows into one of the compartments of the polyester film shell. The advantage to this method of creating a resin mastic gel time is the simplicity in making a gel change by increasing or decreasing the flow rate of the pigmented inhibitor solution.

The amount of pigmented inhibitor solution injected into the resin mastic stream is less than 1% by mass, with a preferred range of 0.1% to 0.5%.

An injection pump was setup. A pigmented inhibitor solution was made. The pigmented inhibitor solution was 2 parts by volume of an inorganic green oxide pigment dispersion to one part 15% hydroquinone solution in polyester. The viscosity range of the pigmented inhibitor solution was between 800 and 4000 centipoise. The flow rate on the injection system into an injection quill located in the resin mastic fill tube was adjusted with a variable frequency drive. Several resin cartridges were produced with both a fast gel time and a slow gel time sections. The length of the slow gel time section of the cartridge was controlled by the timing of the injection valve. The pigment made the inhibitor solution clearly visible in the cartridge. The transition area in the cartridge from the first to slow gel time was distinct, but the transition from slow to fast gel had sporadic drops of pigmented inhibitor and a transition area of several inches. The injection point for the inhibitor solution was past the end of the resin mastic fill tube and the visible amount of inhibitor visible from the outside of the cartridge was approximately ¼" wide.

An on-off vacuum system was added to the above to pull a small vacuum on the injection quill after the injection valve was closed. The purpose of the vacuum was to eliminate dripping of the pigmented inhibitor solution from the injection quill caused by either gravity or the venturi effect of the resin mastic flow past the injection quill. The vacuum was created from using a small hydraulic cylinder as a piston in a tube to pull the vacuum after the inhibitor injection valve was closed. A second upgrade in equipment was to relocate the end of the injection quill 1½" from the end of the resin tube. The slow to fast transition was more distinct than above. The pigmented inhibitor was distributed closer to the polyester film shell of the cartridge with a colored area of approximately ¾" width.

What is claimed is:

1. A method for adjusting gel time of a grouting system used for anchoring a reinforcing member in an opening, said method comprising:

providing a grouting system comprising a package, said package comprising a tubular member formed of a polyester film and having a first compartment and a second compartment; said first compartment discrete from said second compartment; wherein a resin mastic is disposed in the first compartment and an initiator is disposed in the second compartment, wherein said system further comprises a first fill tube operatively connected to said first compartment for delivery of resin mastic into said first compartment; a second fill tube operatively connected to said second compartment for delivery of said initiator into said compartment; a first fill line operatively connected to said first fill tube for delivery of said resin mastic into said first fill tube; a second fill line operatively connected to said second fill tube for delivery of said initiator into said second fill tube; a portion of the first fill tube having an inlet opening through which a third line extends interiorly and downwardly through said first fill tube; and said third fill line operatively connected to said first compartment for delivery of a pigmented inhibitor into said first compartment;

adding said pigmented inhibitor to the resin mastic disposed in the first compartment via said third fill line sufficient to make the inhibitor visible in the resin mastic; and controlling the amount of pigmented inhibitor added to the resin mastic disposed in the first compartment sufficient to provide a predetermined amount of resin mastic with pigmented inhibitor and a predetermined amount of resin mastic without pigmented inhibitor.

2. The method of claim 1 wherein the pigmented inhibitor is disposed in the first compartment adjacent to the polyester film sufficient to make the inhibitor visible in the resin mastic.

3. The method of claim 1 wherein the pigmented inhibitor is disposed in the first compartment adjacent to the polyester film as a longitudinal strip having a width sufficient to make the inhibitor visible in the resin mastic.

4. The method of claim 3 wherein the longitudinal strip has a width of from about 0.1 to about 1.0 inch.

5. The method of claim 1 further comprising controlling the amount of pigmented inhibitor added to the resin mastic disposed in the first compartment sufficient to discretely segregate the resin mastic with pigmented inhibitor from the resin mastic without pigmented inhibitor.

6. The method of claim 1 wherein a vacuum generator operatively connected to the third fill line is used for controlling the stopping of pigmented inhibitor added to the resin mastic disposed in the first compartment sufficient to discretely segregate the resin mastic with pigmented inhibitor from the resin mastic without pigmented inhibitor.

7. A grouting system for anchoring a reinforcing member in an opening, said grouting system comprising:

a package comprising a tubular member formed of a polyester film and having a first compartment and a second compartment; said first compartment discrete from said second compartment; wherein a resin mastic is disposed in the first compartment and an initiator is disposed in the second compartment, wherein said system further comprises a first fill tube operatively connected to said first compartment for delivery of resin mastic into said first compartment; a second fill tube operatively connected to said second compartment for delivery of said initiator into said compartment; a first fill line operatively connected to said first fill tube for delivery of said resin mastic into said first fill tube; a second fill line operatively connected to said second fill tube for delivery of said initiator into said second fill tube; a portion of the first fill tube having an inlet opening through which a third line extends interiorly and downwardly through said first fill tube; and said third fill line operatively connected to said first compartment for delivery of a pigmented inhibitor into said first compartment; and said pigmented inhibitor disposed in the first compartment adjacent to the polyester film sufficient to make the inhibitor visible in the resin mastic.

8. The grouting system of claim 7 wherein the pigmented inhibitor is disposed in the first compartment adjacent to the polyester film as a longitudinal strip having a width sufficient to make the inhibitor visible in the resin mastic.

9. The grouting system of claim 8 wherein the longitudinal strip has a width of from about 0.1 to about 1.0 inch.

10. The grouting system of claim 7 wherein the initiator comprises catalyst mastic or a free radical generating component.

11. The grouting system of claim 7 wherein the initiator comprises benzoyl peroxide.

12. The grouting system of claim 7 wherein the resin mastic comprises polyester with a styrene monomer crosslinking agent.

13. The grouting system of claim 7 wherein the resin mastic comprises a styrene monomer.

14. The grouting system of claim 7 wherein the resin mastic further comprises limestone.

15. The grouting system of claim 7 wherein the inhibitor comprises a free radical inhibitor.

16. The grouting system of claim 7 wherein the inhibitor comprises hydroquinone or toluhydroquinone.

17. The grouting system of claim 7 wherein the inhibitor further comprises a colorant.

18. The grouting system of claim 7 wherein the colorant is a pigment.

\* \* \* \* \*